Aug. 23, 1960 P. D. WENZEL 2,949,969
REVERSIBLE DISC PLOW
Filed Feb. 3, 1958 3 Sheets-Sheet 1

INVENTOR.
Philip D. Wenzel
BY Soans, Anderson,
Luedeka + Fitch

Aug. 23, 1960

P. D. WENZEL 2,949,969

REVERSIBLE DISC PLOW

Filed Feb. 3, 1958

INVENTOR.
Philip D. Wenzel
BY Soans, Anderson,
Luedeka & Fitch
Attys.

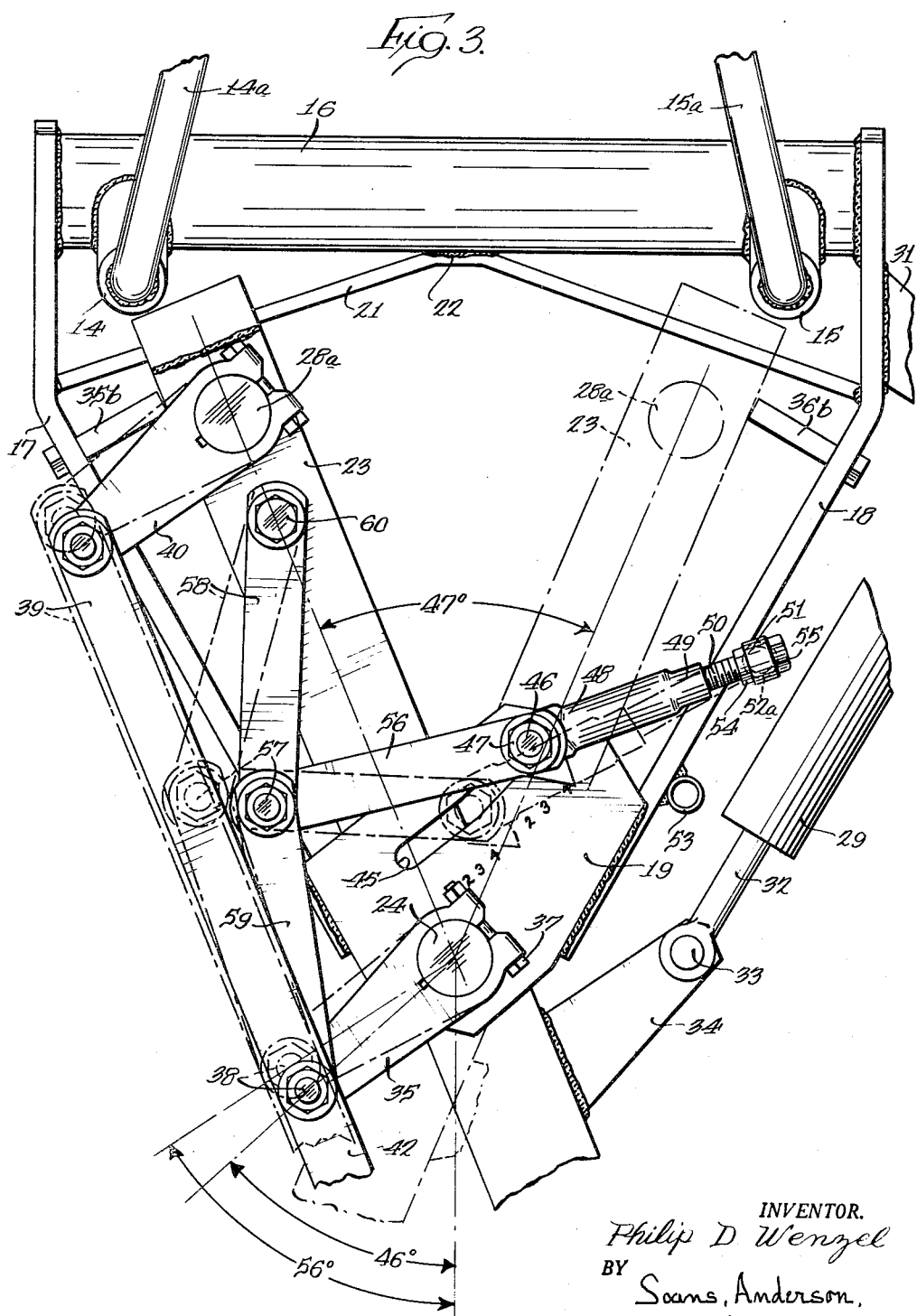

United States Patent Office 2,949,969
Patented Aug. 23, 1960

2,949,969

REVERSIBLE DISC PLOW

Philip D. Wenzel, Stockton, Calif., assignor to J. I. Case Company, Racine, Wis., a corporation of Wisconsin Filed Feb. 3, 1958, Ser. No. 712,926

6 Claims. (Cl. 172—222)

This invention relates to reversible disc plows of the type usually propelled by tractors, and has particular value in connection with reversible plows such as are described in United States patents to Brown, No. 1,149,720 and Coviello, Nos. 2,084,629 and 2,163,832.

The invention herein is in the nature of a modification of, or an improvement upon, the reversible disc plow construction disclosed in the Donald J. Campbell application, Serial No. 531,715, filed in the U.S. Patent Office on August 31, 1955. These two applications are owned by the same assignee. As to any subject matter disclosed in the Campbell application, I do not claim priority of invention.

One of the principal objects of the present invention is to provide a reversible disc plow of the class described in which, when reversing the discs, an improved arrangement is used to adjust or control the angling of the discs so that after changing the direction of plowing, the angle of the disc in each position will suit the particular requirements prevailing at the time. For example, in a reversible disc plow of this character, there is a correct angle for the disc, depending upon various factors such as the spacing of the discs, whether the plows are to be adjusted for a broad or a narrow cut, whether deep or shallow plowing is desired, and also whether the diameter of the discs is large or small.

In the drawings accompanying this application and illustrating a preferred embodiment of the invention, I have shown a tractor-drawn, three-disc, reversible plow in which the invention is incorporated.

Figure 3 is a similar plan view showing the implement arranged for taking a narrow cut.

Figure 1:
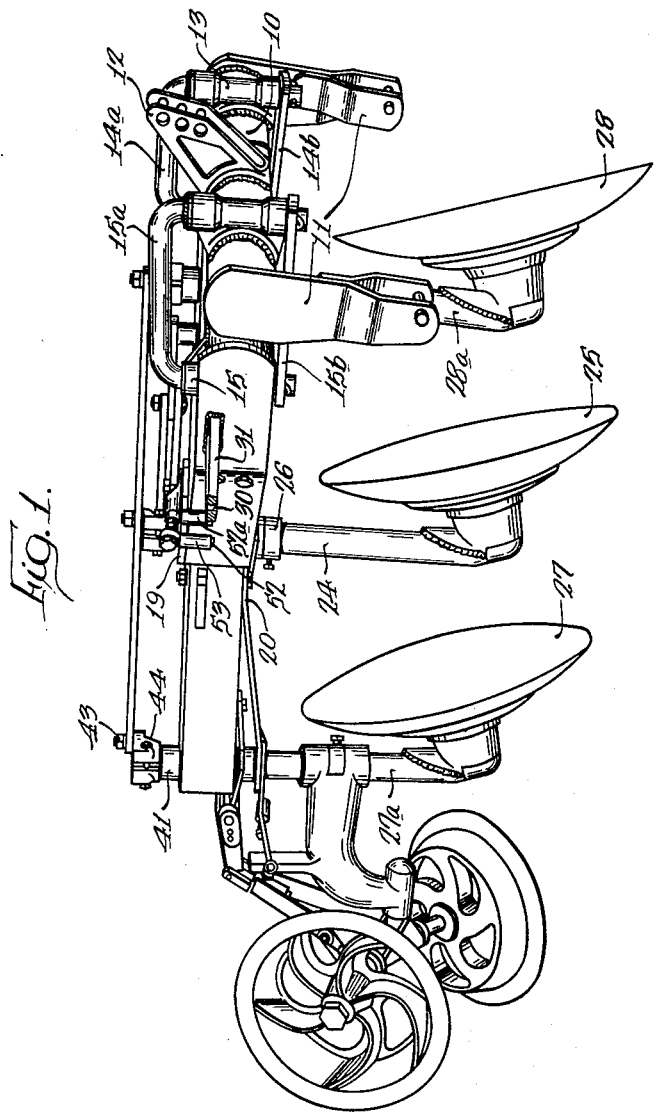
Figure 1 is a close-up photographic view, looking towards the plowed ground, of the implement arranged for left-hand plowing.

Referring to the drawings, it will be understood that the tractor, not shown, is connected to the hitching element 10. This element 10 is an integral cross-member having depending arms 11 and an upstanding bifurcated arm 12 to which the tractor may be connected in a well-known manner. This cross-member 10 is also equipped with a pair of spaced, integral sockets 13 which are connected to complementary sockets 14 and 15, on a cross piece 16 forming the front member of the main frame of the plow.

The connection between the hitching bar 10 and the plow frame is effected through a pair of U-shaped draft bars 14a and 15a, the depending legs of which extend through the sockets 13 on the hitching member 10 and the complementary sockets 14 and 15 on the front bar 16 of the plow frame. The depending legs of the U-shaped draft bars 14a and 15a extend below the sockets a sufficient distance to permit said lower ends to be further tied together by means of tie links 14b and 15b.

Said main frame also includes integral side bars 17 and 18 which are bent towards each other at the rear and the spaced extremities of which are connected together by a pair of upper and lower spaced flat gusset plates 19 and 20. Said main frame is also additionally braced together by means of an integral tie bar 21, the center of which is bent forward to abut the cross member 16 of the frame and is welded thereto as shown at 22.

The rear extremities of the members 17 and 18 are spaced apart to accommodate the plow beam 23, the vertical dimension of which is such that it can swing between the gusset plates 19 and 20.

The swinging plow beam 23 is pivoted on the vertical axle or standard 24 which carries at its lower end a mounting or bearing for the intermediate disc 25 of the plow. Said axle or standard 24 is rotatable in aligned holes bored in the gusset plates 19 and 20, and also in aligned holes bored in the upper and lower spaced flanges of the hollow, rectangular plow beam 23, so that the beam 23 and the axle 24 and the main frame of the plow can all rotate in or relative to each other. The spacing of said three relatively rotating elements is effected by means of suitable washers or collars fixed on the axle 24, one of said collars being indicated at 26, so that relative vertical movement of said parts is prevented, while they are permitted to rotate freely relative to each other.

The rear disc 27 and the front disc 28 are carried by axles 27a and 28a, which are mounted to rotate freely in the rear and front ends of the plow beam 23 as in the case of the axle 24.

When reversing a disc plow of this reversible type from left hand to right hand plowing, or vice versa, it is necessary to change the inclination of the plane of the disc to the line of draft so that its working edge will always be presented to the plowed ground at a draft angle which is found to be the most efficient in view of the character of the ground and the type of plowing which is to be accomplished. It is also desirable that there be a suitable spacing between the vertical disc axles.

It is found that the desired spacing of the plow axles along the plow beam is coupled with the requirement that the axles must have a suitable transverse spacing so that the cut of each disc will be of the desired width. These coupled requirements are usually met by making the angular throw of the plow beam on either side of the center line of draft somewhat less than 45°. This generally requires that the axles of the plows must be rotated to some extent in the beam in the same direction as the beam is rotated when the beam is swung from left hand to right hand position or vice versa.

Also, the operator of the plow, usually an individualist, may want to use discs of different diameters, or may find it necessary to set the plow to penetrate more deeply into the ground, or to vary the width of the cut. For any of these reasons, he may wish to vary the amount of the angular rotary movement of the axles in the plow beam in order to set the discs at a desired angle relative to the line of draft. This is particularly true when changing the width of the cut, because if the angular throw of the plow beam relative to the line of draft be reduced in order to reduce the width of the cut, the rotary movement of the axles of the discs in the plow beam must be increased. Vice versa, when the angular throw of the beam in the frame is increased in order to get a wider cut, the angular movement of the axle in the plow beam must be reduced.

My invention accomplishes all of these results in a simple and effective manner by means of the adjustable linkage which will now be described.

Figure 2:
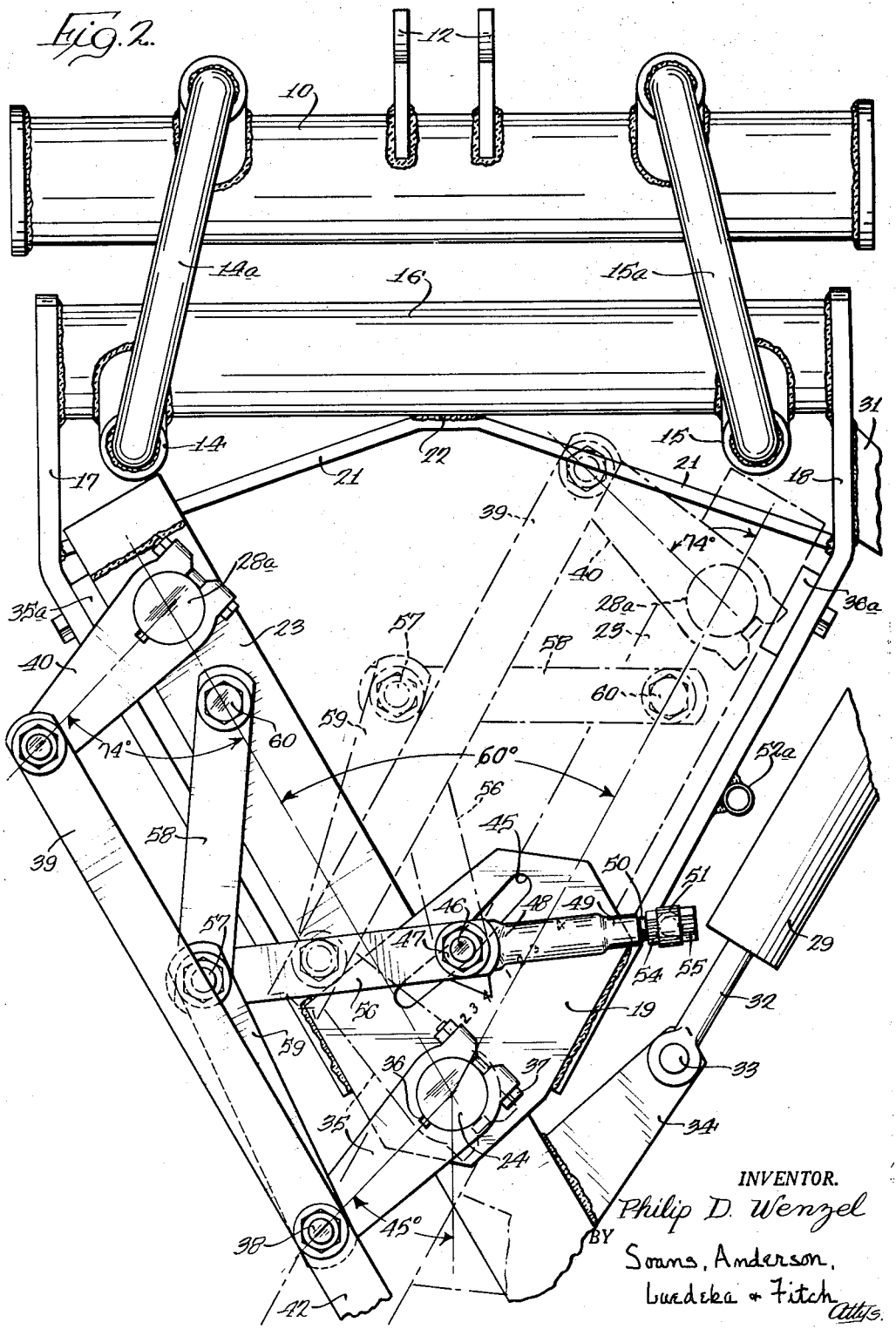
Figure 2 is a fragmentary plan view of the implement as arranged for taking a wide cut.

The swinging movement of the plow beam 23 in the main frame of the plow, when reversing the direction of plowing, is effected in the present instance by means of a hydraulic cylinder, indicated at 29, the stroke of which is sufficient to effect the maximum required swing of the plow beam between its extreme positions. One end of this hydraulic cylinder 29 is pivoted at 30 to a lug 31 welded to the frame member 18, and the rod 32 of the hydraulic device is pivotally connected at 33 to a lug 34 welded to the plow beam 23 behind the pivot 24. In the wide cut position, as indicated in Figure 2, the beam is arranged for maximum throw and is arranged to swing between the flat limiting stops 35a and 36a bolted to the members 17 and 18 of the frame respectively. In the case of a narrow cut, as indicated in Figure 3, the swinging movement of the beam is reduced by reason of the use of longer stops 35b and 36b bolted to the inner surfaces of said frame members.

The rotary movement of the vertical axles of the plows in the plow beam 23, so as to obtain the correct disc angle to suit varying conditions, is accomplished by the following mechanism. It will be seen that on the upper end of the plow axle 24, there is fixed an arm or crank 35 by means of a key 36 and a clamping bolt 37, the inner end of the crank 35 being slotted to accommodate said key 36 in order to make the clamping bolt 37 effective. The outer end of the crank 35 is fitted with a stud or bolt 38 which serves as a pivot connection for a forwardly extending link 39, the leading end of which is pivotally connected to a crank 40 fixed on the forward axle 28a in the same manner as the axle 24. Similarly, in the case of a three-disc plow, as shown in the drawings, the rear axle 41 is actuated by the movement of the crank 35 by means of a rearwardly extending link 42 connecting the pin 38 on the crank 35 with a pin 43 on the crank 44, which is fixed on the upper end of said rear axle 41. In the case of a three-disc plow construction as shown in the drawings, the centers of the axles 28a, 24 and 41 in the plow beam 23 are preferably in alignment and the spacing between them is preferably alike.

By means of the linkage just described, any rotary motion which is transmitted to the crank 35 which is fixed on the axle 24 in the plow beam 23, is transmitted to the axles 28a and 41 by means of links 39 and 42. In the present instance, the rocking movement of the crank 35 in the beam 23 is accomplished as follows.

Referring to Figure 2, which shows the implement with the beam and discs in position for left hand plowing, it will be seen that in the upper gusset plate 19, there is formed a slot 45 within which there is adjustably mounted a pivot or control pin 46. This pin 46 remains fixed in a selected position in the gusset plate 19 during normal operation of the plow in both directions and its position is adjusted only when the operator desires to select a different setting in order to change the cut or draft angle of the discs.

For convenience, instead of using the nut 47 as the sole means for clamping the pivot 46 in its selected position in the slot 45, it is preferable to use another clamping device. This comprises a link 48, the end of which is bored out to fit the pin 46, said link being flattened at its end, as shown at 49, the outer part of said link being enlarged, drilled out and tapped to receive the threaded end of an adjusting screw 50. The neck of said screw extends through the head 51 of a stud 52 mounted in a vertically extending boss 53 bored out to receive the vertical shank of said stud so that said stud 52 may turn freely within the head 51 of said boss 53. The adjusting screws 50 are capable of rotating freely within the head 51 but there is a nut 54 on said screw 50 for locking said screw at any desired setting of the control pin 46.

Said adjustable pin or stud 46 constitutes a pivot for one end of a horizontally disposed transverse link 56, the other end of which is pivotally connected to the hinge point 57 of a toggle device comprising a pair of links 58 and 59. The rear end of the link 59 is pivotally connected to the pin 58 on the end of the arm 35 and the outer or forward end of the link 58 is connected to a pivot pin 60 located preferably on the beam 23 and on a line connecting axles 24 and 28a, and located at a point which is substantially closer to the center of the axle 28a than to the center of the axle 24.

The various series of numbers 1, 2, 3 and 4 on the drawings, rearwardly of the slot 45 in the gusset plate 19 indicate different selected positions into which the control pin 46 may be moved by the adjusting screw 55 in order to accomplish a change in the angling of the plow discs. Normally, the horizontal diameter of the disc is substantially parallel with a line connecting the axis of the disc axle, e.g. 24, with the pivot on the end of the control arm 35, which arm controls the angling of the disc in the beam 23.

In the present instance, this disc angle, for the wide cut as shown in Figure 2, is about 45° to the line of draft, so that the disc and arm 35 must move through an angle of 90° when reversing the plow. However, as shown in Figure 2, when the beam swings in its arc between stops 35a and 36a, it moves through an angle of only about 60°, so that each reversal of the plow requires a supplementary angular movement of 30° by the arm 35 in the plow beam 23.

If it is desired to increase the 45° plowing angle shown in Figure 2, the arm 35 must be adjusted in the beam by moving the link 39 forwardly. This is effected by shifting the control pin 46 rearwardly and to the left, which causes the hinge point 57 to move outwardly and thus decreases the angle between the links 58 and 59 of the toggle. This in turn reduces the distance between the pin 60 and the pin 38, and thus effects a slight clockwise movement of the arm 35 in the plow beam 23. Thus the disc angle is increased.

On the other hand, if it is desired to reduce the disc angle of 45° shown in Figure 2, the control pin 46 is moved forwardly and to the right with the reverse effect.

With the "broad cut" arrangement shown in Figure 2, the disc angle relative to the line of draft, which is 45° in the position shown, can be varied through a range of about 10°. When plowing with a narrow cut, as shown in Figure 3 of the drawings, with the beam's arc of movement limited to 47° by the stops 35b and 33b, the pin 52 (see Figure 1) has been removed from the boss 53 and placed in the boss 52a, which is welded to the side of the frame piece 18 of the main frame a substantial distance forwardly of the boss 52. In this position, as shown in Figure 3, the control pivot 46 in full line position is located in the forward end of the slot 45 and the plowing angle in this position is about 46°. When the control pin 46 is moved down towards the rear end of the slot 45, to the dotted line position in Figure 2, so as to bring the parts shown in the dotted line position shown in Figure 3, the disc angle is increased to about 56°, which is sufficient to take care of all reasonable requirements.

With the arrangements shown, through all of the ranges of adjustment which have been described, and when using the parts in the position of Figure 3, as well as in Figure 2, it is found that the linkage is, in all substantial respects, symmetrical in effect, i.e. the reversal of the plow at the end of the furrow does not materially change the plow angle.

It will be observed that with the linkage arrangement as shown, during the normal operation of the plow in the field, including the reversing operations at the end of each furrow, there are no sliding contacts between any of the various parts so that there is very little opportunity for sand or other undesirable material to work into the parts to cause friction or wear. However, whenever needed, because of the wear of the discs, or for other reasons, the operator desires to make some slight correction or adjustment of the angle of the disc, it is simple to do so.

The features of the invention believed to be new and patentable are set forth in the appended claims.

I claim:

1. A reversible disc plow implement having a main frame, a forwardly extending beam pivoted on said frame so as to be swingable on a substantially vertical axis to reverse the plowing direction, a plurality of spaced, axially vertical axles carried by and rotatable in said beam and connected together for rotation in unison, discs on the lower ends of said axles, and means for rotating said axles in said beam as an incident to the reversal of the beam, comprising an arm rotatable on the beam and connected to one of said axles for rotating said axle, a toggle comprising a pair of links having their inner ends hinged together and having their outer ends connected respectively to said arm and to a point on said beam spaced from the beam axis, and a connection between said toggle hinge and the frame.

2. A reversible disc plow implement having a main frame, a beam having a forwardly extending part, said beam being pivoted on said frame so as to be swingable on a substantially vertical axis to reverse the plowing direction, a plurality of spaced, axially vertical axles carried by and rotatable in said beam and connected together for rotation in unison, discs on the lower ends of said axles, and means for rotating said axles in said beam as an incident to the reversal of the beam, comprising an arm fixed on one of said axles, a toggle comprising a pair of links having their inner ends hinged together and having their outer ends connected respectively to said arm and to a point on said beam part spaced from the beam axis, and a link connecting the hinge of said toggle to a control point on said frame which is spaced from said beam pivot a distance less than the distance between the beam pivot and the adjacent axle pivot.

3. A reversible disc plow implement having a main frame, a forwardly extending beam pivoted on said frame, so as to be swingable in a forward arc on a substantially vertical axis to reverse the plowing direction, a pair of axially vertical axles longitudinally spaced along, and rotatable in, said beam and connected together for rotation in unison, discs on the lower ends of said axles, and means for rotating said axles in said beam as an incident to the reversal of the beam, comprising an arm fixed to the rear axle for rotating said axle and pivoted to rotate on said beam on a vertical axis substantially coinciding with the axis of the beam, a toggle comprising a pair of links having their inner ends hinged together and having their outer ends connected respectively to said arm and to a point on said beam spaced forwardly from the beam axis, and a link connecting the hinge of said toggle to a control point on said frame which is spaced forwardly from said beam pivot a distance less than the distance between the beam pivot and the forward axle pivot.

4. A reversible disc plow implement having a main frame, a forwardly extending beam pivoted on said frame so as to be swingable on a substantially vertical axis to reverse the plowing direction, a plurality of spaced, axially vertical axles spaced longitudinally along, and rotatable in, said beam and connected together for rotation in unison, discs on the lower ends of said axles, and means for rotating said axles in said beam as an incident to the reversal of the beam, comprising an arm pivoted on and carried by the beam and fixed to one of said axles for rotating the same, a toggle comprising a pair of links having their inner ends hinged together and having their outer ends connected respectively to said arm and to a point on said beam spaced from the beam axis, and a link connecting the hinge of said toggle to a control point on said frame which is spaced from said beam pivot a distance less than the distance between the beam pivot and the adjacent axle pivot.

5. A reversible disc plow implement having a main frame, a beam having a forwardly extending part pivoted on said frame so as to be swingable on a substantially vertical axis to reverse the plowing direction, a plurality of spaced, axially vertical axles spaced longitudinally along, and rotatable in, said beam and connected together for rotation in unison, discs on the lower ends of said axles, and means for rotating said axles in said beam as an incident to the reversal of the beam, comprising an arm mounted on and keyed to one of said axles, a toggle joint comprising a pair of links having their inner ends hinged together and having their outer ends connected respectively to said arm and to a point on said beam spaced from the beam axis, and a link connecting the hinge of said toggle to a control point on said frame which is spaced from said beam pivot a distance less than the distance between the beam pivot and the adjacent axle pivot, and within the arc of movement of said beam.

6. A reversible disc plow implement having a main frame, a beam pivoted on said frame so as to be swingable on a substantially vertical axis to reverse the plowing direction, a plurality of axially vertical axles spaced longitudinally along, and rotatable in, said beam and connected together for rotation in unison, discs on the lower ends of said axles, and means for rotating said axles in said beam as an incident to the reversal of the beam, comprising an arm mounted on, and fixed to, one of said axles, and a toggle joint comprising a pair of links having their inner ends hinged together and having their outer ends connected respectively to said arm and to a point on said beam spaced from the beam axis, a link connecting the hinge of said toggle to a control point on said frame which is spaced from said beam pivot a distance less than the distance between the beam pivot and the adjacent axle pivot, and within the arc of movement of said beam, one of said links being manually adjustable so as to select different angular positions of the arm in said plow beam.

References Cited in the file of this patent
UNITED STATES PATENTS
2,648,267    Pursche _____ Aug. 11, 1953